United States Patent [19]

Busch

[11] Patent Number: 5,739,979
[45] Date of Patent: Apr. 14, 1998

[54] RECORDING AND REPRODUCING APPARATUS HAVING A COMPACT CASSETTE HOLDER FOR ACCOMMODATING CASSETTES OF DIFFERENT SIZES

[75] Inventor: Andreas Busch, Guntramsdorf, Austria

[73] Assignee: U.S. Philips Corporation, New York, N.Y.

[21] Appl. No.: 589,434

[22] Filed: Jan. 22, 1996

[30] Foreign Application Priority Data

Jan. 30, 1995 [AT] Austria ............................ 156/95

[51] Int. Cl.⁶ ........................................... G11B 15/675
[52] U.S. Cl. ................................................. 360/94
[58] Field of Search .................. 360/94, 96.5; 242/33.6

[56] References Cited

U.S. PATENT DOCUMENTS

| | | | |
|---|---|---|---|
| 4,918,550 | 4/1990 | Baranski | 360/94 |
| 5,184,261 | 2/1993 | Noguchi | 360/94 |
| 5,237,470 | 8/1993 | Sasaki et al. | 360/94 |

*Primary Examiner*—Stuart S. Levy
*Assistant Examiner*—Brian E. Miller
*Attorney, Agent, or Firm*—Robert M. McDermott

[57] ABSTRACT

An apparatus (1) comprising a cassette holder (5) which has a bottom wall (6) and into which, at option, a larger first cassette (7) or at least one smaller further cassette (8) can be inserted, and comprising at least one positioning device (37, 38, 39) for the smaller further cassette (8) and a blocking device (54, 55, 56) for the positioning device (37, 38, 39), which locking device serves for blocking the positioning device (37, 38, 39) in its positioning position, the positioning device (37, 38, 39) and the blocking device (54, 55, 56) have been arranged on the cassette holder (5) in the area of the bottom wall (13), and the blocking device (54, 55, 56) and the positioning device (37, 38, 39) are movable into the non-blocking position and into the non-positioning position, respectively, by the larger first cassette (7) when it is inserted into the cassette holder (5).

12 Claims, 5 Drawing Sheets

RECORDING AND REPRODUCING APPARATUS HAVING A COMPACT CASSETTE HOLDER FOR ACCOMMODATING CASSETTES OF DIFFERENT SIZES

The invention relates to a recording and/or reproducing apparatus comprising a cassette holder with a holder compartment bounded by a bottom wall and into which, at option, a first cassette having first main surfaces, or at least one further cassette having further main surfaces can be inserted, the first main surfaces of the first cassette being larger in at least one dimension than the further main surfaces of the further cassette, and comprising at least one positioning device for positioning the further cassette in the holder compartment, which positioning device is movable between a positioning position and a non-positioning position and has a positioning element for the further cassette, which positioning element in the positioning position of the positioning device is disposed in the holder compartment and is movable out of and into the holder compartment in the area of the bottom wall of the cassette holder and in the non-positioning position of the positioning device is disposed substantially outside the holder compartment, and comprising a blocking device for blocking the positioning device in its positioning position, which blocking device is movable between a blocking position and a non-blocking position and comprises a blocking element which locks the positioning device in its positioning position in the blocking position of the blocking device and allows the positioning device to move into its non-positioning position in the non-blocking position of the blocking device, and which comprises a detection element for the mechanical detection of the first cassette, via which the blocking device can be set from its blocking position to its non-blocking position when the first cassette is loaded into the cassette holder.

An apparatus of the type defined in the opening paragraph is known from, for example, U.S. Pat. No. 5,016,127. In this known apparatus the cassette holder is fixedly mounted inside the apparatus and the positioning device and the blocking device are arranged on a stationary apparatus chassis, i.e. in an area underneath the cassette holder and remote from the bottom wall of the cassette holder, but two detection elements of the blocking device are located above the level of the bottom wall at the level of a side wall of the cassette holder, which side wall has two passages through which the two detection elements can cooperate with a side face of a first cassette of larger dimensions. Since the positioning device and the blocking device in the known apparatus are situated on an apparatus chassis underneath the cassette holder a comparatively large space is required in a direction perpendicular to the bottom wall, which is unfavorable for a comparatively small dimension of the apparatus in this direction. Moreover, the blocking device in the known apparatus, whose blocking elements are situated underneath the cassette holder and whose detection elements are situated at the level of the cassette holder, is of a comparatively intricate construction, which is unfavourable for a low-cost and reliable construction.

It is an object of the invention to mitigate the above problems and to improve an apparatus of the type defined in the opening paragraph in a simple manner, so as to enable comparatively small dimensions of the apparatus in a direction perpendicular to the bottom wall of the cassette holder and a simple construction to be achieved. To achieve this, according to the invention, an apparatus of the type defined in the opening paragraph is characterised in that the positioning device and the blocking device have been arranged on the cassette holder in the area of the bottom wall, and in that the detection element of the blocking device have been arranged and adapted to cooperate with the first main surface of the first cassette which faces the bottom wall of the cassette holder. Thus, it is achieved by very simple means that the apparatus dimensions in a direction perpendicular to the bottom wall of the cassette holder can be kept very small and a very simple construction can be obtained. Moreover, it is thus achieved in a simple manner that the measures in accordance with the invention can be used advantageously in those apparatuses which have a cassette holder which is movable between a loading position, in which a cassette can be loaded into the cassette holder, and an operating position, in which a cassette present in the cassette holder occupies an operating position in the apparatus, because the positioning device and the blocking device, which are situated in the area of the bottom wall of the movable cassette holder, are moved along with this cassette holder and thus perform their functions in a correct manner independently of the instantaneous position of the cassette holder. In addition, it is thus achieved that the blocking device and the positioning device are simply and easily movable as a result of the cooperation with the first main surface of a first cassette, which first main surface faces the bottom wall of the cassette holder, the weight of such a first cassette being adequate to achieve this.

An advantageous embodiment of an apparatus in accordance with the invention is characterised in that there has been provided a spring which is supported in the area of the bottom wall of the cassette holder and which resiliently urges the positioning device towards its positioning position and the blocking device towards its blocking position in that this spring acts upon the blocking device. Thus, it is achieved that the positioning device is automatically movable into its positioning position and the blocking device into its blocking position by means of the spring and can be held in these positions by means of the spring.

In this respect it has also proved to be advantageous if the positioning device comprises at least one hook which projects from this device towards the bottom wall of the cassette holder and is urged against the bottom wall of the cassette holder by the springs to limit the movement of the positioning device and the blocking device. In this way, the positioning device is accurately positioned in its positioning position and the blocking device in its blocking position by means of the hook and under the influence of the spring.

It has further proved to be advantageous if the positioning device comprises a flap which is pivotable about a pivotal axis in the area of the bottom wall of the cassette holder and at a free end remote from the pivotal axis has a cross-sectionally substantially L-shaped angular portion forming the positioning element of the positioning device. In this way it is possible to obtain a very compact and flat construction for the positioning device. Moreover, it is thus achieved that owing to its pivotal arrangement the positioning device is movable very smoothly between its positioning position and its non-positioning position. The positioning element in the form a the L-shaped angular portion guarantees an accurate positioning of a further cassette both in the height direction of this cassette and in the lateral direction of this cassette, which direction extends parallel to the cross-sectional direction of the L-shaped angular portion.

In this respect it has proved to be particularly advantageous if in the area of the L-shaped angular portion provided as positioning element a positioning projection has been provided, by means of which the further cassette can be positioned in the longitudinal direction of the L-shaped angular portion. This also ensures in a simple manner an accurate positioning of a further cassette in the lateral direction of this cassette, which direction extends perpendicularly to the cross-sectional direction of the L-shaped angular portion.

It has further proved to be advantageous if the blocking device has at least one lever arm arranged to be pivotable about a further pivotal axis and connected to a limb situated adjacent the lever arm and forming the blocking element of the blocking device. This is also advantageous for an as compact as possible construction. A further advantage is then that owing to its pivotal arrangement the blocking device is movable very smoothly between its blocking position and its non-blocking position. Moreover, a simple construction is obtained in this way.

It has further proved to be particularly advantageous if the free end of the lever arm which is remote from the further pivotal axis forms the detection element of the blocking device. This leads to a particularly simple construction because the desired result is achieved without the use of a separate detection element.

It has also proved to be very advantageous if the positioning device and the blocking device are situated in the area of at least one passage in the bottom wall of the cassette holder, and the positioning device in its non-positioning position and the blocking device in its non-blocking position are situated substantially in the passage. This results in a very compact construction.

The invention will be described below with reference to an embodiment given by way of example and shown in the drawings, but the invention is not limited to this example.

Figure 1:
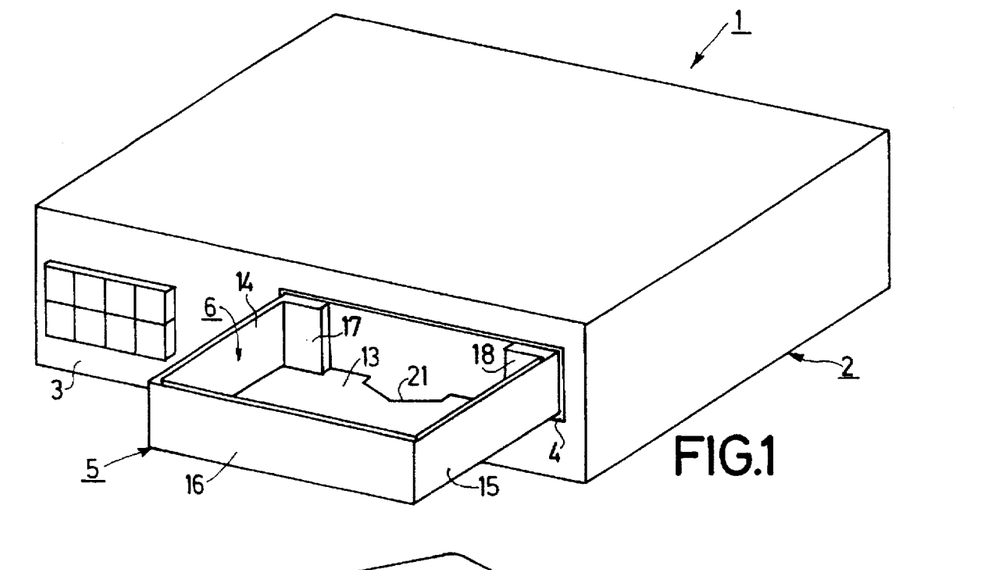
FIG. 1 is a highly diagrammatic oblique view showing a recording and reproducing apparatus having a cassette holder for optionally holding a larger first cassette or a smaller further cassette.

FIG. 1 shows a recording and reproducing apparatus 1, i.e. a video recorder 1, in a highly diagrammatic manner. The apparatus 1 has a housing 2 whose a front wall 3 has an opening 4 through which a movable cassette holder 5 of the apparatus 1 is movable. The cassette holder 5 is movable between a loading position shown in FIG. 1, in which a cassette can be loaded into the cassette holder 5, and an operating position, not shown, in which a cassette inserted into the cassette holder 5 occupies an operating position in the apparatus 1. The cassette holder 5 is movable along an L-shaped path of movement, the cassette holder first being moved parallel to its main surfaces out its loading position shown in FIG. 1 and subsequently being lowered perpendicularly to its main surfaces.

Figure 2:
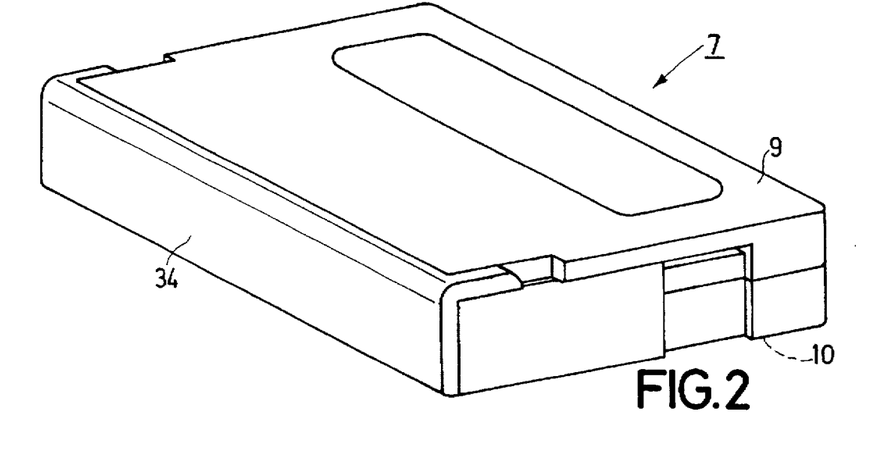
FIG. 2 is a diagrammatic oblique view showing the larger first cassette.
Figure 3:
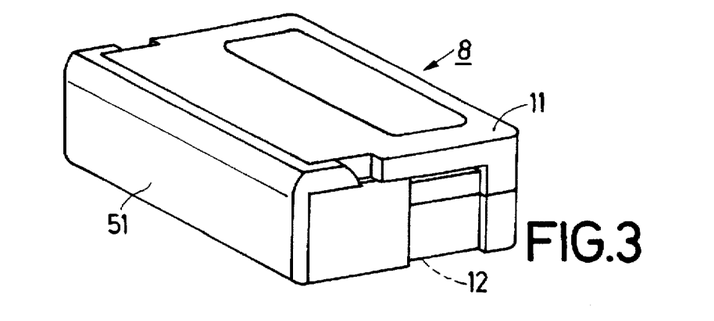
FIG. 3 is a diagrammatic oblique view showing the smaller further cassette.

The cassette holder 5 has a holder compartment 6 into which, at option, a larger first cassette 7, as shown in FIG. 2, or a smaller further cassette 8, as shown in FIG. 3, can be loaded. The larger first cassette 7 has first main surfaces, i.e. a first upper surface 9 and a first lower surface 10, which is not visible in FIG. 2. The smaller further cassette 8 has two further main surfaces, i.e. again a further upper surface 11 and a further lower surface 12, which is not visible in FIG. 3. As is apparent from FIGS. 2 and 3, two dimensions, i.e. both the length dimension and the width dimension, of the first main surfaces 9 and 10 of the first cassette 7 are larger than those of the further main surfaces 11 and 12 of the further cassette 8. The cassettes 7 and 8 are magnetic-tape cassettes in which two reels are juxtaposed to take up a magnetic tape.

Figure 4:
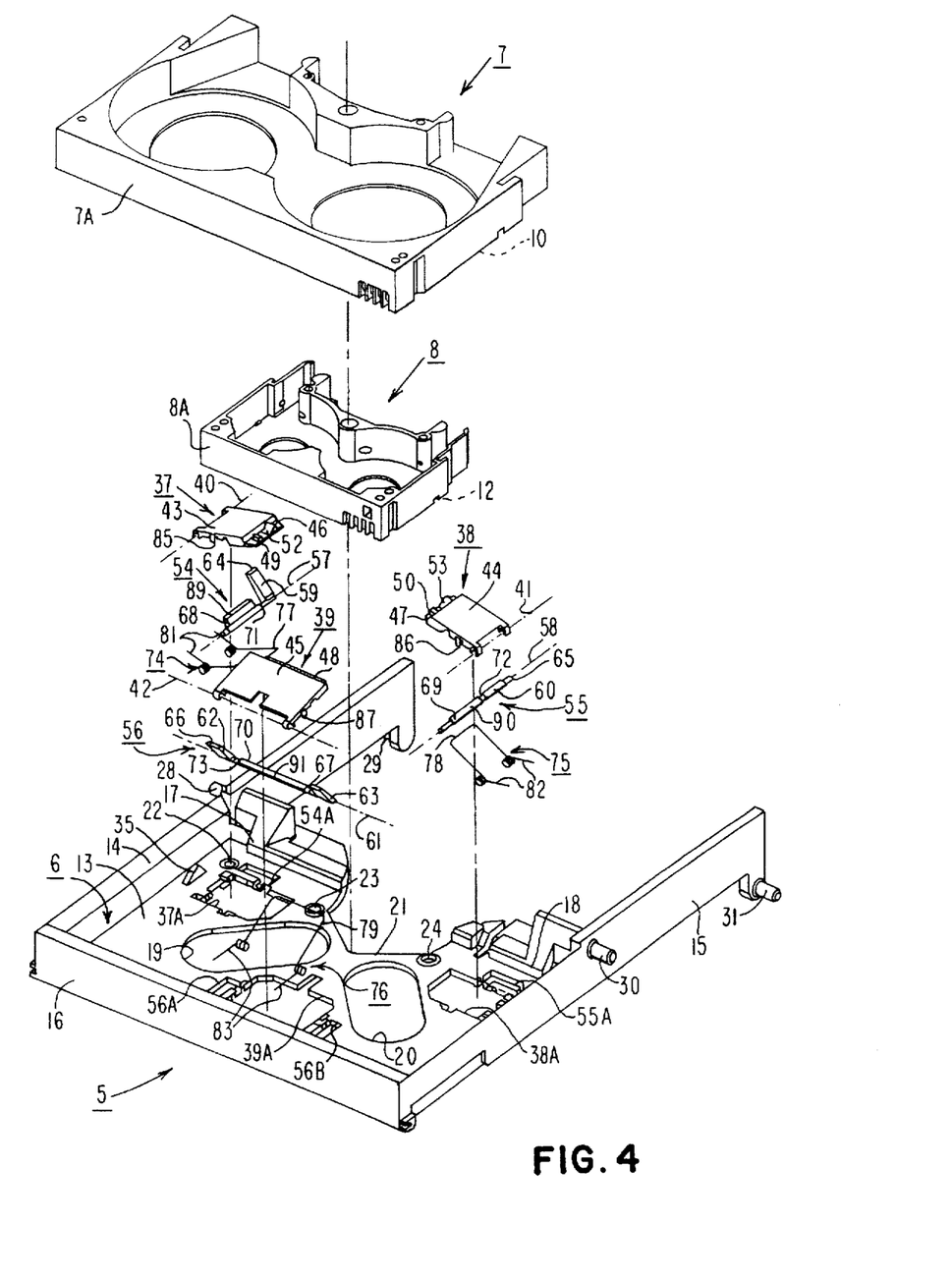
FIG. 4 is an exploded view showing the cassette holder of the apparatus shown in FIG. 1, which for positioning the smaller further cassette comprises three positioning devices, which each cooperate with a blocking device which is movable by the larger first cassette.
Figure 5:
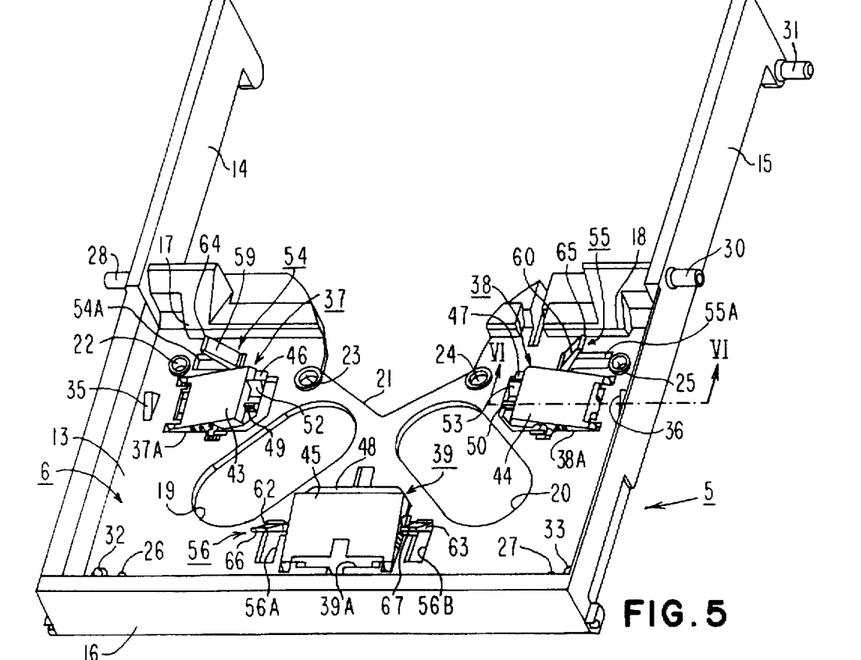
FIG. 5 is an oblique view showing the cassette holder of the apparatus of FIG. 1 in its assembled condition.

The empty cassette holder 5 of the apparatus 1 is shown in detail in FIGS. 4 and 5. As is apparent from FIGS. 4 and 5, the cassette holder 5 essentially comprises a bottom wall 13, two strip-shaped side walls 14 and 15, which are integral with the bottom wall 13, a front section 16, connected to the side walls 14 and 15, and two wall portions 17 and 18, which are integral both with the bottom wall 13 and with a respective one of the two side walls 14 and 15. The bottom wall 13, the two side walls 14 and 15, the front section 16 and the two wall portions 17 and 18 bound the holder compartment 6 of the cassette holder 5. Either the first cassette 7 or the further cassette 8 can be inserted into the holder compartment 6. FIG. 4 shows only the respective bottom section 7A or 8A of these cassettes.

The bottom wall 13 has two oval openings 19 and 20. These openings 19 and 20 allow the passage of reel discs and reel spindles of the apparatus 1 in order to drive the reels in the cassettes 7 and 8. The bottom wall 13 further has a substantially V-shaped opening 21 through which tape guide elements of the apparatus can be brought into operative contact with a magnetic tape accommodated in a cassette 7 or 8. The bottom wall 13 further has six holes 22, 23, 24, 25, 26 and 27 for the passage of cassette-positioning pins of the apparatus. These cassette-positioning pins enter into operative engagement with the cassette in the cassette holder 5 when the cassette holder 5 has been moved into its operating position in order to position the inserted cassette accurately in its operating position both in the lateral direction and in the height direction.

It is to be noted that the cassette holder 5 has two guide pins 28, 29 and 30, 31, respectively, on its two side walls 14 and 15. These guide pins 28, 29, 30 and 31 engage L-shaped guide slots provided in the apparatus to guide the cassette holder 5 along its L-shaped path of movement.

During the movement of the cassette holder 5 between its loading position shown in FIG. 1 and its operating position, not shown, the cassette inserted in the cassette holder 5 should be positioned in an optimum manner in the cassette holder 5 in order to guarantee that the reel discs, reel spindles, tape guide elements and cassette positioning pins of the apparatus can correctly enter into operative engagement with the inserted cassette while the cassette holder 5 is being lowered into its operating position.

To position the larger first cassette 7 in the holder compartment 6 of the cassette holder 5 during a movement of the cassette holder 5 between its loading position and its operating position the apparatus 1 shown in FIG. 1 comprises two positioning pins 32 and 33 which project from the bottom wall 13 of the cassette holder 5. These positioning pins 32 and 33 engage positioning holes provided for this purpose in the area of the lower surface 10 of the larger first cassette 7.

It is to be noted that the larger first cassette 7 has a movable cassette shutter 34, which is held in its closed position by means of a latching device. To release the latching device holding the cassette shutter 34 two wedge-shaped release projections 35 and 36 have been provided on the bottom wall 13 of the cassette holder 5.

Figure 11:
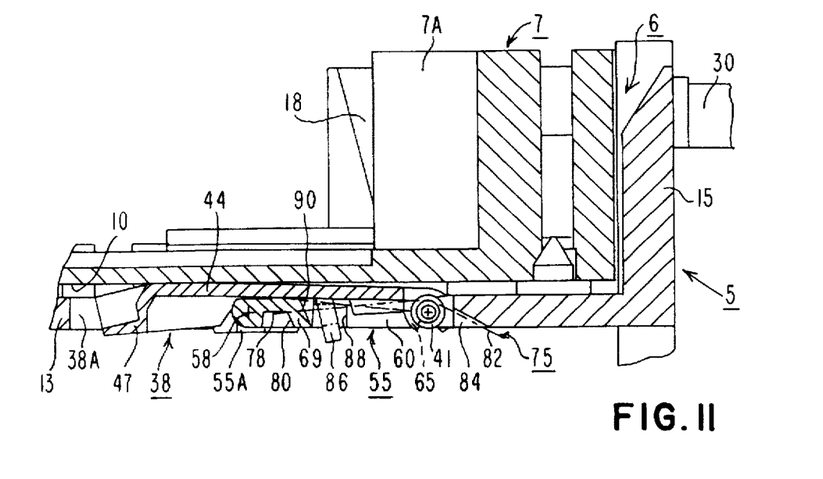
FIG. 11 is a sectional view taken on the line XI—XI in FIG. 10 and showing a part of the cassette holder of FIG. 10, which part includes a positioning device and a blocking device which cooperates with this positioning device, these two devices being held in a displaced position by the larger first cassette.

To position the smaller further cassette 8 in the holder compartment 6 of the cassette holder 5 during a movement of the cassette holder 5 between its loading position and its operating position the apparatus 1 shown in FIG. 1 comprises altogether three positioning devices 37, 38 and 39, which are suitably arranged in the area of the bottom wall 13 of the cassette holder 5. Each of these positioning devices 37, 38 and 39 is situated in the area of a passage 37A, 38A and 39A of the bottom wall 13 and is movable between a positioning position, shown in FIGS. 5 to 9, and a non-positioning position, shown in FIG. 11. In the non-positioning position each of the three positioning devices 37, 38 and 39 is situated substantially in the corresponding passage 37A, 38A and 39A, respectively, as is shown in FIG. 11 for the positioning device 38. This is advantageous for a particularly compact and space-saving construction. Each of the three positioning devices 37, 38 and 39 comprises a flap 43, 44 and 45, respectively, which is pivotable about a pivotal axis 40, 41 and 42, respectively, in the area of the bottom wall 13 of the cassette holder 5. At a free end remote from its respective pivotal axis 40, 41 or 42 each of the three flaps 43, 44 and 45 has a cross-sectionally substantially L-shaped angular portion forming a positioning element 46, 47 or 48, respectively, of the respective positioning device 37, 38 or 39. Each of the three positioning elements 46, 47 and 48 is situated in the holder compartment 6 of the cassette holder 5 in the positioning positions of the positioning devices 37, 38 and 39 shown in FIGS. 5 to 9. Each of the three positioning elements 46, 47 and 48 is movable into and out of the holder compartment 6 in the area of the bottom wall 13 of the cassette holder 5, as a result of which each of the positioning elements 46, 47 and 48 is situated substantially outside the holder compartment 6 in the non-positioning positions of the positioning devices 37, 38 and 39, as is shown in FIG. 11 for the positioning device 38.

In the area of the L-shaped angular portions provided as positioning elements 46 and 47 the two positioning devices 37 and 38 comprise a positioning projection 49 and 50, respectively, by means of which the smaller further cassette 8 can be positioned in the longitudinal direction of the L-shaped angular portion, i.e. in a direction parallel to the two side walls 14 and 15 of the cassette holder 5. This positioning is effected in such a manner that the two positioning projections 49 and 50 engage recesses provided for positioning purposes in the area of the lower wall 12 of the smaller further cassette 8.

It is to be noted that, similarly to the larger first cassette 7, the smaller further cassette 8 has a movable cassette shutter 51, which is held in its closed position by means of a latching device. To release the latching device for the cassette shutter 34 two wedge-shaped release projections 52 and 53 have been provided in the area of the positioning elements 46 and 47 formed by the L-shaped angular portions of the two positioning devices 37 and 38, to cooperate with the release devices when a small further cassette 8 is loaded into the cassette holder 5.

To block each positioning device 37, 38 and 39 in its positioning position the present apparatus 1 advantageously has a blocking device 54, 55 and 56, respectively, which is arranged on the cassette holder 5 in the area of the bottom wall 13 and is movable between a blocking position, shown in FIGS. 5 to 9, and a non-blocking position, shown in FIG. 11. The two blocking devices 54 and 55 each have a lever arm 59 and 60, respectively, arranged in the area of a passage 54A and 55A in the bottom wall 13 of the cassette holder 5 so as to be pivotable about a further pivotal axis 57 and 58, respectively. The blocking device 56 has two lever arms 62 and 63 arranged in the area of two passage 56A and 56B in the bottom wall 13 of the cassette holder 5 so as to be pivotable about a further pivotal axis 61. The free ends of the lever arms 59, 60, 62 and 63, which are remote from the further pivotal axes 57, 58 and 61, each form a detection element 64, 65, 66 and 67, respectively, of the respective blocking device 54, 55 or 56. The detection elements 64, 65, 66 and 67 serve for the mechanical detection of the presence of the larger first cassette 7. For this purpose, the detection elements 64, 65, 66 and 67 have been arranged and adapted to cooperate with the first lower surface 10 of the larger first cassette 7, which surface 10 faces the bottom wall 13 of the cassette holder 5. By means of the respective detection element 64, 65, 66 or 67 the relevant blocking device 54, 55 or 56 can be set from its blocking position to its non-blocking position when the larger first cassette 7 is loaded into the cassette holder 5.

Each of the three blocking devices 54, 55 and 56 comprises a blocking element 68, 69 and 70, respectively, which in the blocking position of each blocking device 54, 55 or 56, as shown in FIGS. 5 to 9, blocks the positioning device 37, 38 or 39, respectively, in its positioning position shown in FIGS. 5 to 9, and in the non-blocking position of each blocking device 54, 55 or 56, as shown in FIG. 11, allows the respective positioning device 37, 38 or 39, to move into its non-positioning position shown in FIG. 11. In the present case, each lever arm 59, 60 or 62, 63 is connected to a limb situated adjacent the relevant lever arm 59, 60 or 62, 63 via a respective spindle 71, 72 or 73 and forming the blocking element 68, 69 or 70 of the respective blocking device 54, 55 or 56. In the non-blocking position of the blocking devices 54, 55 and 56 the lever arms 59, 60, 62 30 and 63 of the blocking devices 54, 55 and 56 are situated substantially in the corresponding passages 54A, 55A, 56A and 56B and the limbs forming the blocking elements 68, 69 and 70 of the blocking devices 54, 55 and 56 are situated substantially in the passages 37A, 38A and 39A, as FIG. 11 shows for the blocking device 55. This is advantageous for a particularly compact and space-saving construction.

Figure 6:
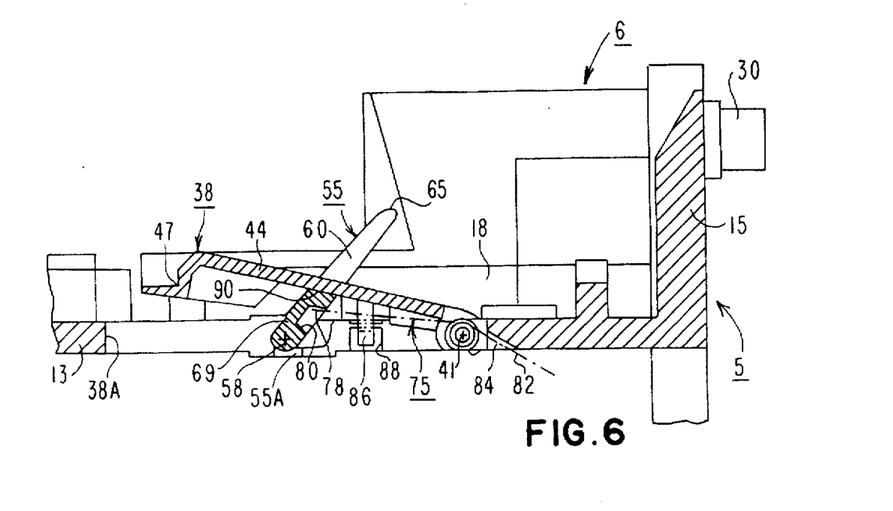
FIG. 6 is a sectional view taken on the line VI—VI in FIG. 5 and shows a part of the cassette holder of FIG. 5, which holder comprises a positioning device and a blocking device cooperating with this positioning device.
Figure 9:
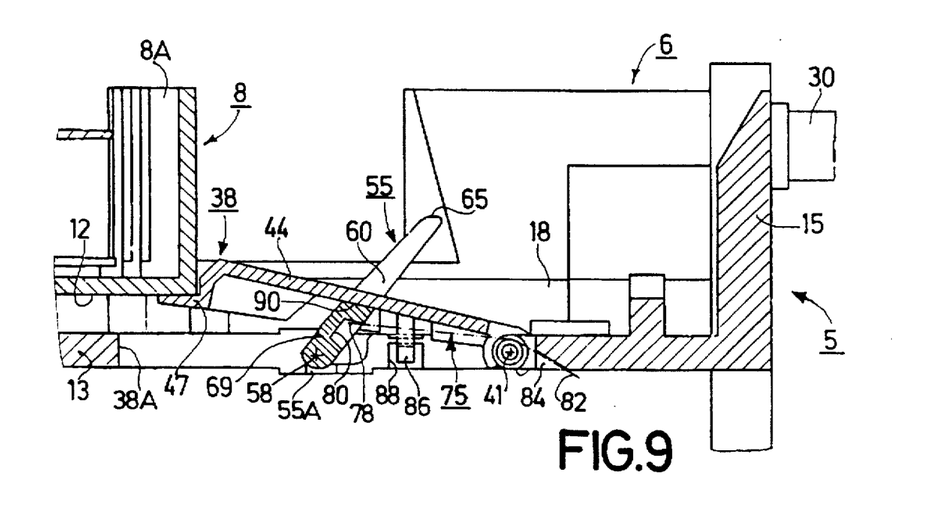
FIG. 9 is a sectional view taken on the line IX—IX in FIG. 7 and showing a part of the cassette holder of FIG. 7, in which part includes a positioning device and a blocking device which cooperates with this positioning device, the smaller further cassette having been positioned in the cassette holder by means of the positioning device.
Figure 10:
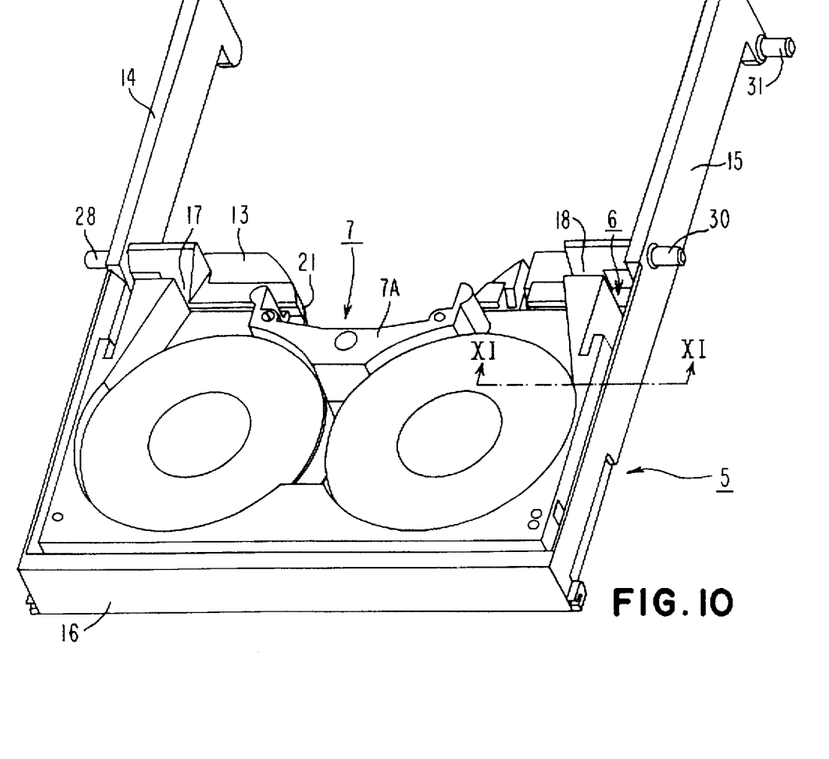
FIG. 10 shows, in the same way as FIGS. 5 and 7, the cassette holder of the apparatus shown in FIG. 1, the cassette holder containing a larger first cassette.

The present apparatus 1 comprises three substantially U-shaped leg springs 74, 75 and 76, of which the leg spring 75 is shown in dash-dot lines in FIGS. 6, 9 and 11. The coiled portions of the leg springs 74, 75 and 76 are arranged to be coaxial with the pivotal axes 40, 41 and 42 of the positioning devices 37, 38 and 39. Each these leg springs 74, 75 and 76 acts upon the respective blocking device 54, 55 or 56 with the end of its U-shaped portion 77, 78 or 79, respectively. For this, the ends of the U-shaped portions 77, 78 and 79 of the leg springs 74, 75 and 76 each engage in a recess 80 in the limb forming the respective blocking element 68, 69 or 70, as is shown in FIGS. 6, 9 and 11 for the blocking device 55. The free ends 81, 82 and 83 of the leg springs 74, 75 and 76 are supported in the area of the bottom wall 13 of the cassette holder 5. This is achieved in that each of the leg springs 74, 75 and 76 engages a recess 84 in the bottom wall 13 of the cassette holder 5, as is shown in FIGS. 6, 9 and 11 for the leg spring 75. The positioning devices 37, 38 and 39 are spring-loaded towards their positioning positions and the blocking devices 54, 55 and 56 towards their blocking positions by means of the leg springs 74, 75 and 76.

Each of the three positioning devices 37, 38 and 39 comprises two hooks 85, 86 and 87, which project from the respective flap 43, 44 or 45 of the respective positioning device 37, 38 or 39 and have angular hook ends which are directed away from the relevant flaps 43, 44 and 45. Each of these hooks 85, 86 and 87 abuts against the bottom wall 13 of the cassette holder 5 under the influence of the respective leg springs 74, 75 and 76 when the positioning devices 37, 38 and 39 are in their positioning positions, shown in FIGS. 5 to 9, and when the blocking devices 54, 55 and 56 are in their blocking positions, also shown in FIGS. 5 to 9, in order to limit the movement of the respective positioning device 37, 38 or 39 and of the respective blocking device 54, 55 or 56. The bottom wall 13 has a recess 88 for each of the hooks 85, 86 and 87, as is shown in FIGS. 6, 9 and 11 for the hook 86 of the positioning device 38. The angular hook ends of the hooks 85, 86 and 87 engage in the recesses 88.

It is to be noted that the limbs forming the blocking elements 68, 69 and 70 each have a supporting surface 89, 90 and 91, respectively, at their free ends, as is shown in FIGS. 6, 9 and 11 for the supporting surface 90 of the blocking element 69. When the blocking devices 54, 55 and 56 are in their blocking positions the supporting surfaces 89, 90 and 91 of the blocking elements 68, 69 and 70 engage against the flaps 43, 44 and 45 of the positioning devices 37, 38 and 39, which are then in their positioning positions.

As is apparent from FIGS. 5 and 6, the positioning devices 37, 38 and 39 and the blocking devices 54, 55 and 56 for blocking the positioning devices 37, 38 and 39 are held in their positioning positions and blocking positions, respectively, by means of the forces exerted by the leg springs 74, 75 and 76 in conjunction with the frictional forces between the supporting surfaces 89, 90 and 91 of the blocking elements 68, 69 and 70 and the flaps 43, 44 and 45 of the positioning devices 37, 38 and 39 if there is no cassette in the cassette holder 5.

Figure 7:
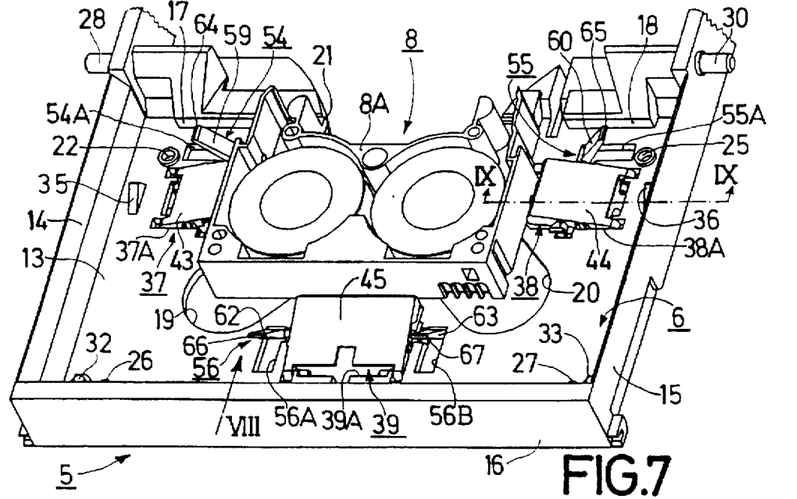
FIG. 7 shows, in the same way as FIG. 5, the relevant part of the cassette holder of the apparatus of FIG. 1, the cassette holder containing a smaller further cassette.
Figure 8:
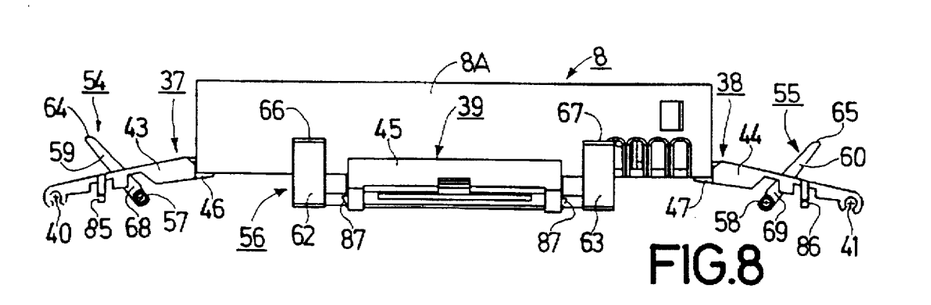
FIG. 8 is a view taken at the arrow VIII in FIG. 7 and showing, with the omission of the cassette holder, the positioning devices and the blocking devices for the positioning devices on the cassette holder and the smaller further cassette positioned by means of the positioning devices.

When a smaller further cassette 8 is inserted into the cassette holder 5 which is in its loading position shown in FIG. 1, insertion should be effected in such a manner that the smaller further cassette 8, as is shown in FIGS. 7 to 9, is positioned in the area between the L-shaped angular portions forming the positioning elements 46, 47 and 48 of the positioning devices 37, 38 and 39. The supporting surfaces 89, 90 and 91 of the limbs forming the blocking elements 68, 69 and 70 then remain in engagement with the flaps 43, 44 and 45 of the positioning devices 37, 38 and 39, the angular relationships between the supporting surfaces 89, 90 and 91 and the flaps 43, 44 and 45 being selected in such a manner that the forces of the leg springs 74, 75 and 76 in conjunction with the frictional forces between the supporting surfaces 89, 90 and 91 and the flaps 43, 44 and 45 are adequate to ensure that, via the limbs forming the blocking elements 68, 69 and 70, the flaps 43, 44 and 45 and hence the L-shaped angular portions forming the positioning elements 46, 47 and 48 remain in their positioning positions suitable for positioning the smaller further cassette 8. The smaller further cassette 8 is then positioned both parallel to the main surfaces 11 and 12 and perpendicularly to the main surfaces 11 and 12 by means of the L-shaped angular portions forming the positioning elements 46, 46 and 48 and by means of the positioning projections 49 and 50. This positioning is necessary and important to keep the smaller further cassette 8 in an accurately defined position 74 when the cassette holder 5 is moved between its loading position and its operating position, thereby guaranteeing that when the cassette holder 5 is moved into or out of its operating position the reel discs, reel spindles, tape guide elements and cassette-positioning pins of the apparatus can correctly cooperate with the smaller further cassette 8 or cease to cooperate with the smaller further cassette 8.

When a larger first cassette 7 is inserted into the cassette holder 5, which is in its loading position as shown in FIG. 1, the detection elements 64, 65 and 66 of the blocking devices 54, 55 and 56, which have been arranged and adapted to cooperate with the first lower surface 10 of the larger first cassette 7, which surface 10 faces the bottom wall 13 of the cassette holder 5, enter into operative engagement with the first lower surface 10. Under the influence of the mass of the larger first cassette 7 this results in the lever arms 59, 60, 62 and 63 being pivoted about the further pivotal axes 57, 58 and 61 towards the bottom wall 13 of the cassette holder 5 in that the forces of the leg springs 74, 75 and 76 and the frictional forces between the supporting surfaces 89, 90 and 91 and the flaps 43, 44 and 45 are overcome, as a result of which the limbs forming the blocking elements 68, 69 and 70 are pivoted away from the flaps 43, 44 and 45, the mass of the larger first cassette 7 also causing the positioning devices 37, 38 and 39 to be pivoted about the pivotal axes 40, 41 and 42 towards the bottom wall 13 of the cassette holder 5. The pivotal movement of the blocking devices 54, 55 and 56 and the positioning devices 37, 38 and 39 under the influence of the mass of the larger first cassette 7 continues until the larger first cassette 7 is supported by parts of the cassette holder 5 and the positioning devices 37, 38 and 39 occupy their non-positioning positions and the blocking devices 54, 55 and 56 occupy their non-blocking positions, which positions are shown in FIG. 11 for the positioning device 38 and for the blocking device 55. Subsequently, the cassette holder 5 with the larger first cassette 7 situated therein can be moved from the loading position shown in FIG. 1 to the operating position, not shown.

When the inserted larger first cassette 7 is removed from the cassette holder 5 after the cassette holder 5 has been moved back from its operating position into its loading position shown in FIG. 1, both the positioning devices 37, 38 and 39 for the smaller further cassette 8 and the blocking devices 54, 55 and 56 advantageously return automatically into their positioning positions and blocking positions, respectively, under the influence of the leg springs 74, 75 and 76.

In the apparatus described above, it has been achieved advantageously by simple means that in the case of a cassette holder which is movable between a loading position and an operating position not only a larger first cassette but also a smaller further cassette remain accurately positioned during a movement of the cassette holder between its loading position and its operating position. Positioning of a smaller further cassette is then achieved by simple means, which further have the advantage that without any separate measures they can be moved out of the space which a larger first cassette occupies in the cassette holder by merely inserting a larger first cassette, in that a larger first cassette first moves the blocking devices for the positioning devices for a smaller further cassette out of their blocking positions and, after this, in addition also moves the positioning devices so far out of their positioning positions until both the blocking devices and the positioning devices are situated outside the space occupied by the larger first cassette inserted into the cassette holder. Another very great advantage to be mentioned is that both the blocking devices and the positioning devices are of a simple and very flat construction and, owing to this flat construction, are disposed substantially within the region of the level of the bottom wall of the cassette holder in their non-positioning positions and their non-blocking positions, so that the apparatus dimensions can be very small in a direction perpendicular to the bottom wall of the cassette holder.

The invention is not limited to the embodiment described hereinbefore by way of example. The embodiment of the apparatus described hereinbefore by way of example comprises altogether three positioning devices for a smaller further cassette in the area of the bottom wall of the cassette holder, two of these positioning devices being adapted to cooperate with the narrow sides of the cassette and one positioning device being adapted to cooperate with the long rear side of the cassette. However, it is also possible to use a construction comprising only two positioning devices adapted to cooperate with the narrow sides of a smaller further cassette. There are also various possibilities as regards the construction of the positioning devices and the blocking devices for the positioning devices. Furthermore, it is to be noted that the measures in accordance with the invention can also be applied to an apparatus having a movable cassette holder into which more than two, for example three, cassettes of different sizes can be inserted, in which case position devices and blocking devices cooperating with these positioning devices are provided for each of the two smaller further cassettes. Moreover, it is to be noted that the measures in accordance with the invention can also be used in an apparatus having a cassette holder which can be closed by means of a pivotable cover and which is fixedly mounted in the apparatus. The measures in accordance with the invention can also be used in apparatuses which are not constructed for operation with magnetic-tape cassettes but for operation with cassettes with other storage media, such as disc-shaped or plate-shaped record carriers.

I claim:

1. A recording and/or reproducing apparatus comprising a cassette holder with a holder compartment bounded by a bottom wall and into which cassette holder, either a first cassette having first main surfaces, or at least one second cassette having second main surfaces can be inserted, the first main surfaces being larger in at least one dimension than the second main surfaces, and said cassette holder comprising at least one positioning device for positioning the second cassette in the holder compartment, which positioning device is movable between a positioning position and a non-positioning position, said positioning device comprising a positioning element for the second cassette, which positioning element in the positioning positions is disposed in the holder compartment and is movable out of and into the holder compartment in the area of the bottom wall of the cassette holder and;

in the non-positioning positions the positioning element is disposed substantially outside the holder compartment, and said cassette holder further comprising a blocking device operably coupled to the positioning device, which blocking device is movable between a blocking position and a non-blocking position, said blocking device comprising a blocking element, which blocking element in the blocking position engages the positioning device and locks the positioning device in its positioning position and, in the non-blocking position allows the positioning device to move into its non-positioning position, and which blocking device comprises a detection element for the mechanical detection of the first cassette for setting the blocking device to its non-blocking position when the first cassette is loaded into the cassette holder, characterized in that the positioning device and the blocking device are arranged on the cassette holder in the area of the bottom wall, and in that the detection element is arranged and adapted to cooperate with the first main surface of the first cassette which faces the bottom wall of the cassette holder.

2. An apparatus as claimed in claim 1, characterized in that the cassette holder further comprises a spring which is supported in the area of the bottom wall of the cassette holder and which spring resiliently urges the positioning device towards its positioning position and the blocking device towards its blocking position.

3. An apparatus as claimed in claim 2, characterized in that the positioning device comprises at least one hook which projects from the positioning device towards the bottom wall of the cassette holder and is urged against the bottom wall of the cassette holder by the spring to limit the movement of the positioning device and the blocking device.

4. An apparatus as claimed in claim 3, characterized in that the positioning device comprises a flap which is pivotable about a pivotal axis in the area of the bottom wall of the cassette holder and at a free end remote from the pivotal axis has a cross-sectionally substantially L-shaped angular portion forming the positioning element of the positioning device.

5. An apparatus as claimed in claim 4, characterized in that in the area of the L-shaped angular portion provided as positioning element a positioning projection has been provided, by means of which the second cassette can be positioned in the longitudinal direction of the L-shaped angular portion.

6. An apparatus as claimed in claim 5, characterized in that the blocking device has at least one lever arm arranged to be pivotable about a second pivotal axis and connected to a limb situated adjacent the lever arm, said limb forming the blocking element of the blocking device.

7. An apparatus as claimed in claim 6, characterized in that the free end of the lever arm which is remote from the second pivotal axis forms the detection element of the blocking device.

8. An apparatus as claimed in claim 7, characterized in that the positioning device and the blocking device are situated in the area of at least one passage in the bottom wall of the cassette holder, and the positioning device in its non-positioning position and the blocking device in its non-blocking position are situated substantially in the passage.

9. An apparatus as claimed in claim 2, characterized in that the positioning device comprises a flap which is pivotable about a pivotal axis in the area of the bottom wall of the cassette holder and at a free end remote from the pivotal axis has a cross-sectionally substantially L-shaped angular portion forming the positioning element of the positioning device.

10. An apparatus as claimed in claim 1, characterized in that the positioning device comprises a flap which is pivotable about a pivotal axis in the area of the bottom wall of the cassette holder and at a free end remote from the pivotal axis has a cross-sectionally substantially L-shaped angular portion forming the positioning element of the positioning device.

11. An apparatus as claimed in claim 1, characterized in that the blocking device has at least one lever arm arranged to be pivotable about a pivotal axis and connected to a limb situated adjacent the lever arm and forming the blocking element of the blocking device.

12. An apparatus as claimed in claim 1, characterized in that the positioning device and the blocking device are situated in the area of at least one passage in the bottom wall of the cassette holder, and the positioning device in its non-positioning position and the blocking device in its non-blocking position are situated substantially in the passage.

* * * * *